Dec. 29, 1959          P. SMITH          2,919,392
BATTERY POWERED OUTBOARD MOTOR
Filed Nov. 30, 1955
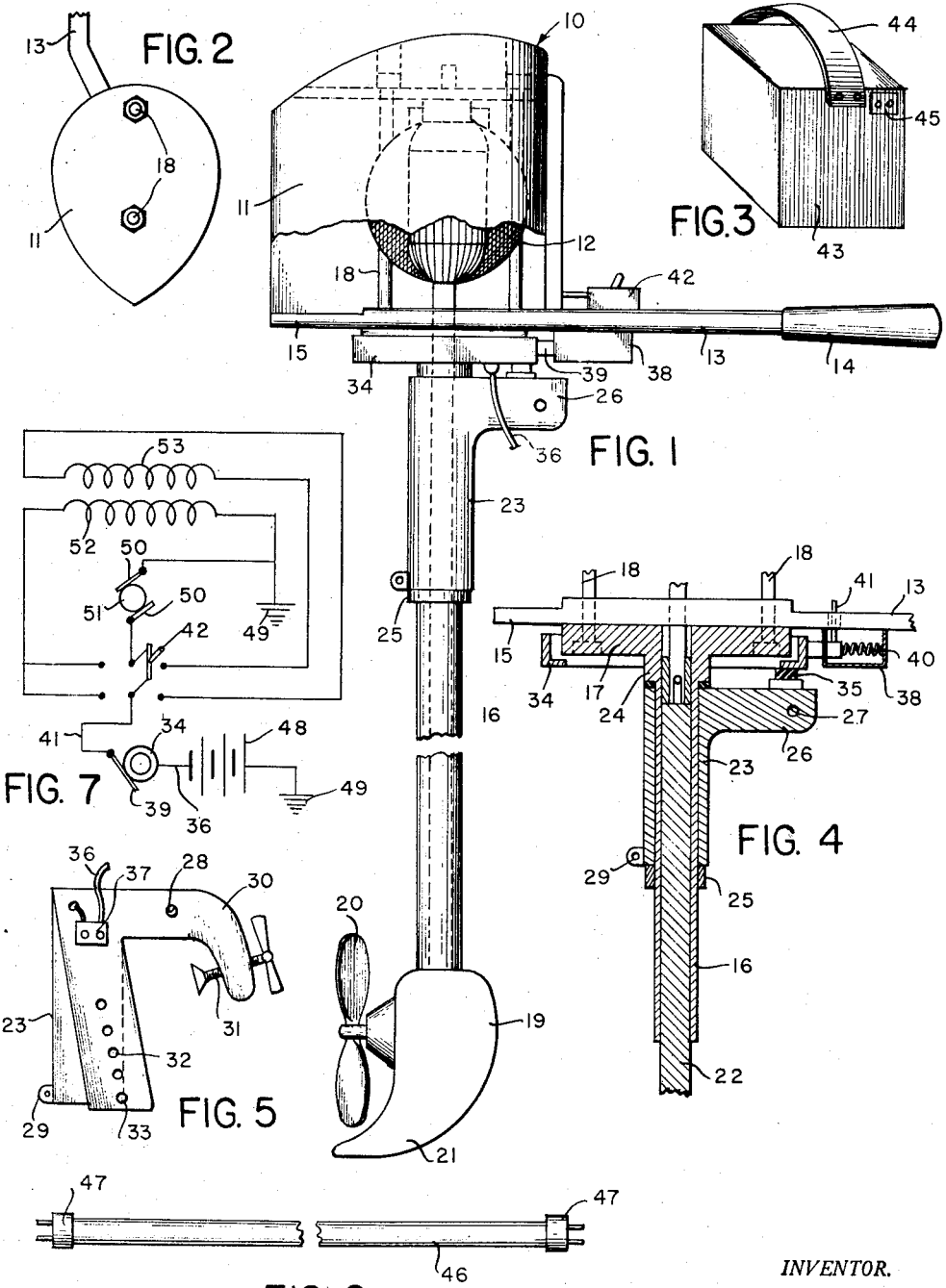
INVENTOR.
PHILLIP SMITH
BY
ATTORNEY

United States Patent Office 2,919,392
Patented Dec. 29, 1959

2,919,392

BATTERY POWERED OUTBOARD MOTOR

Philip Smith, Kissimmee, Fla.

Application November 30, 1955, Serial No. 550,152

1 Claim. (Cl. 318—247)

This invention relates to marine propulsion apparatus and more particularly to a propulsion unit adapted to be readily detached from and supported outboard from small boats.

This invention relates specifically to a small boat propulsion device driven by an electric motor energized from an electrical storage source and having the advantage of silent operation as compared to the conventional internal combustion outboard engine.

In the past, electric outboard motors have been used on small boats, particularly where silence of operation was desired. However, these previous motors have been unsatisfactory for a number of reasons, such as not being freely maneuverable for steering purposes, necessitated by being joined through conductor wires to a source of electrical energy. Further, the field windings in the motors tended to burn out from defects created by contact with water vapor causing boaters much distress and anxiety if this happened at a substantial distance from shore.

An object of this invention is to produce an electrical outboard motor that satisfactorily overcomes the defects of the prior art and to further produce an electric outboard motor which is freely rotatable in relation to its supporting bracket without interference with the necessary energizing conductors.

Still another object of this invention is to provide a two-speed electric outboard motor which does not require the use of rheostats or other resistance type controls which are undesirable due to their heating and inefficient use of current and which in previous electric outboard motors have been a source of trouble due to heated contacts, rust and corrosion.

A further object of this invention is to provide an electric outboard motor that combines two field windings for the production of a dual speed motor and which provides protection against a loss of power due to a defect in a field winding.

Other objects and advantages of the invention will be apparent from the following description taken in conjunction with the accompanying drawings wherein:

Fig. 1 is an elevational view of the subject invention with cut away portions showing the interior of the electric motor;

Fig. 2, a top plan view on a reduced scale of Fig. 1;

Fig. 3, a perspective view of the storage battery receptacle for use with the subject invention;

Fig. 4, an elevational sectional view of the mid-portion of Fig. 1;

Fig. 5, a side elevational view of the boat supporting bracket;

Fig. 6, a plan view of the energizing conductor for use with the subject invention; and Fig. 7, an electrical circuit diagram of the subject invention.

Briefly stated, this invention relates to an electric outboard motor consisting of a conventional propeller driving apparatus powered by an electric motor having two sets of field windings connected to a switch for selectively placing one field winding in series with the armature or the other field winding in parallel with the armature, to produce dual speed operation. The switch is energized by a source of electric energy connected to a conductor ring rigidly mounted on the supporting bracket and contacting a spring pressed brush which rotates about the conductor ring.

With reference to Fig. 1, the outboard motor 10 of the subject invention is shown having an upper power head 11 enclosing an electric motor 12 and having a guiding or steering arm 13 extending therefrom and terminating in a gripping handle 14. Arm 13 is an extension of a bottom plate 15 of head 11, the plate 15 closing the bottom opening of the head 11.

A hollow casing 16 is supported at the lower end of the power head 11 and has an upper flange 17 which contains holes enabling the insertion of elongated bolts 18, which extend to the top of the power head 11 and holding plate 15 in position when fastened by conventional nuts. As seen in Fig. 1, both the heads and nuts are countersunk to provide a finished appearance.

The hollow casing 16 is attached at its lower end to a conventional propeller supporting structure 19, supporting a propeller 20 and having a steering fin 21. As illustrated in Fig. 4, the casing 16 encloses a drive shaft 22, which drives a propeller 20 through the conventional gear train enclosed within the housing 19.

A supporting bracket 23 is rotatively mounted about the upper end of the casing 16 and abuts at its top end a shoulder 24 formed on the casing 16. An adjustable collar 25 is mounted about the casing 16 and below the bracket 23 for holding it in position. The bracket 23 carries an extension 26 at its upper end having pivot holes 27 for receiving a pivot bolt 28. The lower end of the bracket 23 is bifurcated and has a pair of apertured ears 29 containing a bolt for tightening the bifurcated portions about the casing 16 to adjust the amount of desired steering force.

The pivot bolt 28 further holds a clamp bracket 30 pivoted about its outer ends. The clamp bracket 30 is conventional and has threaded screws 31 adapted to be clamped against the stern of a boat. The clamp bracket 30 further contains a series of holes 32 adapted to hold a pin 33 for adjustably determining the inclination of the supporting bracket 23 in relation to the clamp bracket 30.

As illustrated in Figs. 1 and 4, an electrical conductor ring 34 is supported on an insulator 35 which in turn is mounted on the extension 26 of the bracket 23. When the casing 16 and its associated power head 11 is rotatably moved in relation to the supporting bracket 23 the conductor ring 34 remains stationary. A wire 36 has one end attached to the ring 34 and has the other end attached to an electrical female connector 37 mounted on the clamp bracket 30. The connector 37 has two poles with only one pole being connected to the wire 36. The other pole is firmly grounded on the clamp bracket 30.

An insulated brush-supporting container 38 is mounted on the underside of the arm 13 and contains a brush 39 and a spring 40 for holding the brush resiliently against the conductor ring 34. The brush is connected to a conductor 41 which extends upwardly through a hole in the arm 13 to a double-pole, double-throw switch 42. The connection between the switch and the electric motor 12 will be described later in conjunction with Fig. 7.

As illustrated in Figs. 3 and 6, a power supply for the electric motor consists of a conventional battery 48 enclosed with a handy container 43 having a carrying handle 44 and a connector 45 having a pair of female contacts. The enclosed battery is internally connected by conductors to the connector 45. An insulated two-wire conductor 46 is illustrated in Fig. 6 for connecting the battery to the motor and has a pair of connector prongs 47 at each end for use in the female connectors 37 and 45.

A circuit diagram of the electrical system is illustrated in Fig. 7 and consists of a battery 48 connected at one end to a ground 49 and connected at the opposite end to a conductor 36. Conductor 36 is connected to the conductor ring 34 which energizes the brush 39. The brush 39 is connected by the wire 41 to one of the central poles of the switch 42. The switch 42 is diagrammed as a double-pole, double-throw switch. The opposite central pole of the switch 42 is connected to a brush 50 in contact with the commutator 51 of the motor 12. The other brush 50 of the motor 12 is connected to ground 49. The motor 12 further consists of two field windings 52 and 53. Field winding 52 is adapted to be energized in parallel with the armature of motor 12 and therefore is made of a light gauge wire with a large number of turns. The field winding 53 is adapted to be energized in series with the armature of the motor 12 and is made of a heavy gauge wire with relatively few turns. As can be seen from Fig. 7, the switch 42 when in one position will energize winding 52 in shunt with the commutator 51 of the motor 12. When the switch 42 is placed in the opposite position, the winding 53 will then be in series with the commutator 51 of the motor 12.

When the switch 42 is positioned to energize the shunt winding 52 the motor will have a predetermined speed of rotation due to the characteristics of shunt wound motors and winding 52 in the present invention is designed to drive the boat at a low rate of speed. However, when the switch 42 is thrown to energize the series winding 53 the motor will not have a predetermined speed and in the present invention is designed to drive the boat at a much higher rate of speed. Further, if either one of these field windings burns out the switch can be thrown to the opposite position and the motor will still be useful for one speed. Consequently, this feature of having two windings not only produces a two-speed motor but also produces a motor with a safety factor in case one winding becomes defective.

It will be obvious to those skilled in the art, that various changes may be made in the invention without departing from the spirit and scope thereof and therefore the invention is not limited by that which is illustrated in the drawing and described in the specification, but only as indicated in the accompanying claim.

What is claimed is:

For use with a marine propulsion unit and a grounded low voltage source of direct current for driving the unit at different speeds, an electric motor, and switch means connecting said motor to said source, comprising a double pole double throw switch, means connecting one center post of said switch to said source, said motor having an armature with a commutator, two brushes engaging said commutator, means connecting one of said brushes to the other center post of said switch, means connecting the other brush to ground, said motor having a shunt winding connected at one end to ground and having leads from its other end to both contacts on one side of said switch, said motor having a field winding connected across the contacts at the other side of said switch, whereby said source of current may alternately energize said shunt or said field winding to drive said motor, and whereby failure or grounding of one winding will not prevent energization of the other winding.

References Cited in the file of this patent

UNITED STATES PATENTS

| | | |
|---|---|---|
| 650,558 | Hatch | May 29, 1900 |
| 1,021,408 | Haschke | Mar. 26, 1912 |
| 1,953,599 | Grimes | Apr. 3, 1934 |
| 2,079,871 | Price | May 11, 1937 |
| 2,226,700 | Appleman | Dec. 31, 1940 |

FOREIGN PATENTS

| | | |
|---|---|---|
| 668,526 | Germany | Dec. 5, 1938 |